United States Patent

Murphey

[15] 3,662,540
[45] May 16, 1972

[54] SECONDARY AIR CONTROL IN CATALYTIC VEHICLE EXHAUST PURIFICATION SYSTEM

[72] Inventor: Richard C. Murphey, Woodbury, N.J.

[73] Assignee: Mobil Oil Corporation

[22] Filed: Dec. 30, 1970

[21] Appl. No.: 102,591

[52] U.S. Cl. ..............................60/30 R, 23/2 E, 23/288 F
[51] Int. Cl. .....................F02b 75/10, F01n 3/14, F01n 3/16
[58] Field of Search ..........................60/30 R; 23/2 E, 288 F

[56] References Cited

UNITED STATES PATENTS

| | | | |
|---|---|---|---|
| 1,902,160 | 3/1933 | Frazer | 60/30 R |
| 3,072,457 | 1/1963 | Bloch | 60/30 R |
| 3,142,150 | 7/1964 | Pearlman | 60/30 R |
| 3,186,806 | 1/1965 | Stiles | 60/30 R |
| 3,228,746 | 1/1966 | Howk | 60/30 R |
| 3,301,242 | 1/1967 | Candelise | 123/117 A |
| 3,581,490 | 6/1971 | Morris | 60/30 R |

*Primary Examiner*—Douglas Hart
*Attorney*—Oswald G. Hayes, Andrew L. Gaboriault and R. W. Barclay

[57] ABSTRACT

Control of secondary air flow to a dual bed catalytic converter is provided by sensing engine temperature at a location remote from the converter and applying a control function in response thereto to switch air flow between the first and second catalytic beds of the converter. During warm-up secondary air input is directed to the first catalyst bed, but is switched to the second catalyst bed when the temperature in the flow path between the beds reaches about 1,000° F. Engine temperature at a point remote from the beds, e.g. engine coolant temperature, is correlated to the temperature at the outlet of the first catalyst bed thereby enabling sensing of a significantly lower temperature level to control switching of air input to the catalyst beds. A secondary air control valve is operated by application thereto of the engine intake manifold pressure in response to sensed coolant temperature to switch secondary air input between the beds.

15 Claims, 3 Drawing Figures

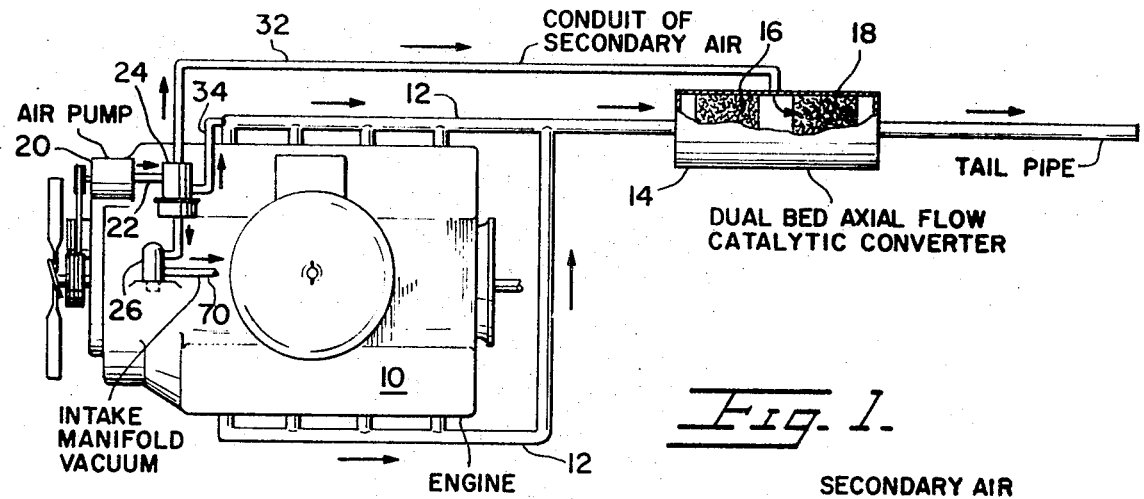
Fig. 1.
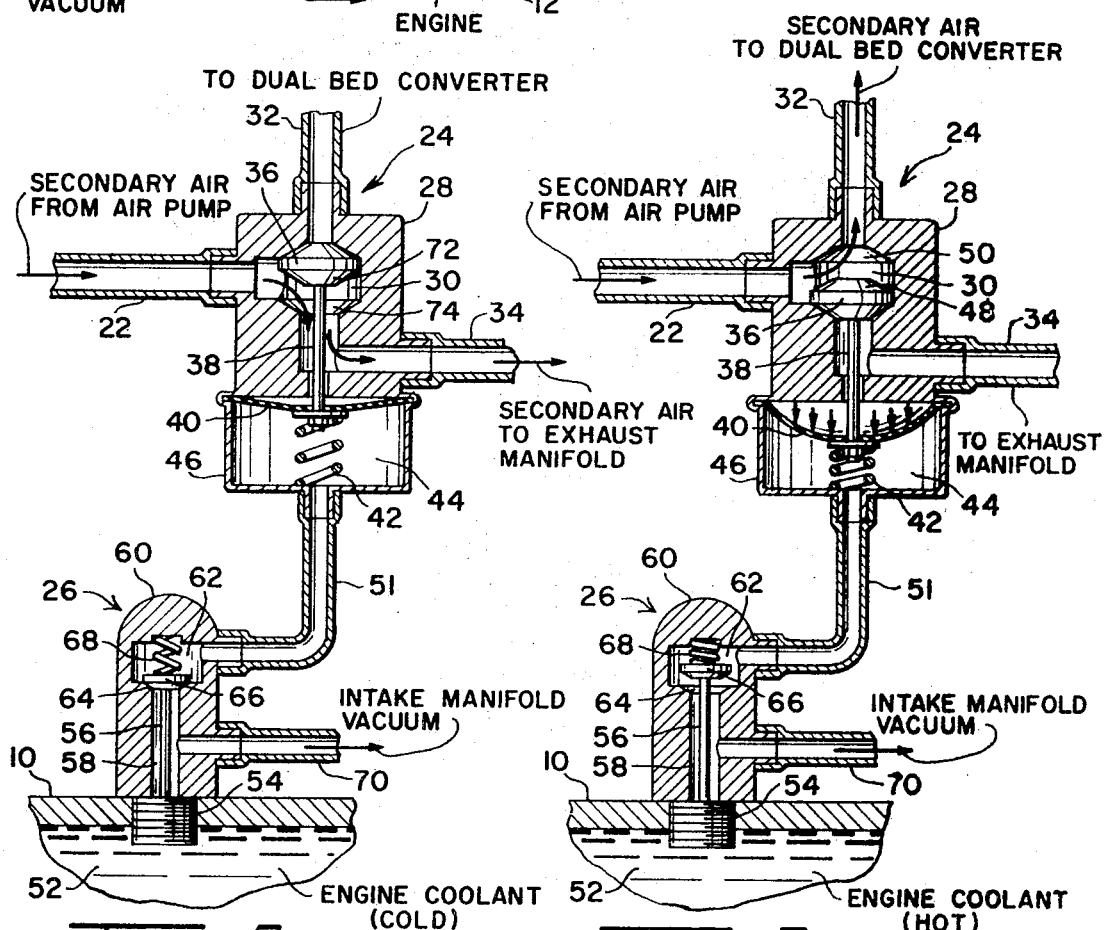
Fig. 2.
Fig. 3.
INVENTOR.
RICHARD C. MURPHEY
BY Raymond W. Barday
ATTORNEY

SECONDARY AIR CONTROL IN CATALYTIC VEHICLE EXHAUST PURIFICATION SYSTEM

BACKGROUND OF THE INVENTION

1. Field of the Invention

The present invention relates to systems for purification of automotive vehicle engine exhausts and more particularly to an arrangement for directing flow of secondary air in a dual bed catalytic converter utilized in connection with an internal combustion engine.

2. Discussion of the Prior Art

Automotive vehicle exhaust emissions are known to contain various noxious elements whose presence in the atmosphere can cause discomforts and create potential health hazards. In some cases, such noxious elements can be lethal if inhaled in sufficient quantities. Modern day prevalence of automotive vehicles, particularly in urban environments involving heavy traffic, creates an urgent need for means to diminish or eliminate the presence of noxious elements in the atmosphere by purification of vehicle exhaust gases.

One system presently in use for purification of vehicle exhaust gases involves passage of the exhaust fumes through a catalytic converter comprising materials whose exposure to the noxious exhaust elements will catalytically react the elements thereby converting them into an inocuous form whose presence in the atmosphere is not objectionable. The noxious elements in automotive exhaust emissions are comprised primarily of carbon monoxide, and usually to a lesser degree of nitric oxide and hydrocarbons. Conversion of carbon monoxide can be accomplished by passing the exhaust gases through a chamber containing an oxidation catalyst whereby the carbon monoxide may be caused to undergo reaction by oxidation into carbon dioxide. The oxidation catalyst provided will also be effective to convert the hydrocarbons by oxidation thereof into carbon dioxide and water. Dual bed catalytic converters have been provided which will effect conversion of the carbon monoxide and hydrocarbons in one bed having an oxidizing atmosphere with reduction of the oxides of nitrogen occuring in the other of the two catalyst beds. Catalysts are available which will function to promote either a reducing or an oxidizing reaction depending upon the availability of excess oxygen to the catalyst bed.

In dual bed converter systems, the beds may be arranged to have the exhaust gases passed serially therethrough, with secondary air being introduced between the two beds, i.e. ahead of the second bed, thereby creating in the second bed an oxidizing atmosphere for conversion of carbon monoxide and hydrocarbons. Lack of excess oxygen in the first bed will create a reducing atmosphere therein for reaction of the nitric oxides.

During the early stages of engine operation and warm-up lower temperature gases are emitted from the engine exhaust. Furthermore, the relative proportion of hydrocarbons and carbon monoxide, as compared with the quantities of nitric oxide, are greater not only because of the lower rate of burning of these elements in the engine but also because of richer engine mixtures during warm-up. Accordingly, it will be found that during warm-up the catalytic converter will be required to react less nitric oxide and relatively greater amounts of hydrocarbons and carbon monoxide.

An additional consideration in the operation of the dual bed catalytic converter is the fact that it is usually desirable to achieve the higher levels of bed operating temperatures rapidly in order to accelerate achievement of optimum levels of impurity reaction. Since both the oxidation and reduction reactions which occur in the converter are enhanced and will proceed more efficiently at the higher temperatures, significant advantage will be derived from acceleration of the achievement of the higher operating temperatures in both beds of the dual bed catalytic converter.

As previously stated, in the normal operation of the dual bed converter, secondary air is introduced between the beds just ahead of the second bed in order to produce an oxidizing atmosphere therein. However, it has been found that important advantages can be derived from temporary introduction of the secondary air ahead of the first bed for the period during warm-up. Since a lesser proportion of nitric oxide is present in the engine exhaust gases during warm-up, there is less need for a reducing bed to react this component of the exhaust gas impurities in this period of engine operation. On the other hand, the relatively greater proportion of hydrocarbons and carbon monoxide will require greater oxidation capacity in the converter. Accordingly, by temporarily applying secondary air input at a point ahead of the first bed of the dual bed converter, there will be developed an oxidizing atmosphere in both beds of the converter thereby providing availability of increased converter capacity for oxidation of the hydrocarbons and carbon monoxide. Furthermore, it will be found that by thus directing secondary air input there will be achieved acceleration of the time required for warm-up of the first bed due to the oxidizing atmosphere developed therein. This accelerated warm-up occurs by virtue of the heat liberated by the oxidation which occurs within the bed, and it will also to some extent operate to produce warm-up of the second catalyst bed.

In addition to the foregoing factors, it has been found that introduction of the secondary air at a point well ahead of the catalytic converter will produce distinct advantages in the operation of the entire purification system. It has been previously known to introduce secondary air at a point as far upstream as possible in the exhaust gas flow path, and preferably as near as is practicable to the engine exhaust port. The advantages derived from this mode of operation arise from the fact that the air will contact the exhaust gases at a point of maximum temperature. As a result of the elevated gas temperature levels, oxidation of the components of the exhaust gas will occur within the engine exhaust manifold and prior to entry of the exhaust gases into the catalytic converter. This will provide a twofold advantage in that it will alleviate the load upon the catalytic converter and assist in accelerating converter temperature elevation by the heat of reaction generated within the engine exhaust manifold.

Thus, it will be seen that at least three distinct and significant advantages will be produced by controlling secondary air input in the manner specified. First, by providing an oxidation atmosphere in the first bed there will be produced heat of reaction which will accelerate warm-up of the first bed during a time of engine operation when provision of a reduction atmosphere is of relatively lesser significance. Secondly, the expanded oxidation capacity will advantageously operate to enhance the capability of the converter to react hydrocarbons and carbon monoxide at a time when their concentration is heaviest. Third, the ability to switch secondary air input away from a point between the two beds enables its introduction at a point well upstream in the exhaust gas path whereby advantage may be taken of the higher gas temperatures to augment oxidation reactions while simultaneously achieving the benefits of accelerating temperature rise.

It has been generally found that the most appropriate operating level for introducing the secondary air between the two beds is when the temperature of the gases leaving the first bed is at a level of about 1,000° F.. Accordingly, it will be understood that in order to derive the aforementioned benefits from secondary air input control it will be necessary to devise apparatus which will direct air flow to a desired point upstream of the catalytic converter during warm-up, and which will subsequently switch air input to between the two beds when appropriate temperature levels are reached. Such apparatus must necessarily include the capability for determining converter temperature levels in order to effect switching of the secondary air input at the appropriate operating level. Since the temperatures within the converter itself at which switching must occur are of the order of 1,000° F. it will be apparent that equipment for sensing temperatures directly within the converter will necessarily be of a relatively complex and expensive nature due to the high level of temperature involved. Thus, problems with regard to cost and complexity of the equipment required could operate to obstruct the practical utilization of the concept of secondary air switching in dual bed catalytic converter systems. Particularly in view of the fact that such systems will be commercially utilized in automotive vehicles where cost is an item of major significance, it will be seen that the ability to effectively produce the benefits discussed without necessitating prohibitively complex and costly equipment will be an advantage of major significance.

SUMMARY OF THE INVENTION

Briefly, the present invention may be described as an improvement for a system for catalytic purification of internal combustion engine exhaust gases, said system including a catalytic converter comprising a first and second catalyst bed, means defining a flow path for serially passing said exhaust gases through said beds, and means for providing air to said catalyst beds, said improvement comprising valve means for directing flow of said air to within said flow path either to a first point ahead of said first catalyst bed or to a second point between said first and said second catalyst beds, means for sensing temperature at a point remote from said converter and comprising temperatures significantly lower than temperatures produced within said converter during engine operation, and means responsive to said temperature sensing means for actuating said valve means to direct said air to either said first or said second point.

By a more specific aspect of the present invention, engine coolant temperature is sensed and a correlation is derived between said coolant temperature and the temperature in the flow path between the beds. When engine coolant temperature reaches a level correlating to a predetermined higher temperature between the beds, intake manifold vacuum pressure is applied to actuate the valve means thereby switching secondary air input from ahead of the first catalyst bed to between the first and the second catalyst beds.

Inasmuch as the point remote from the catalytic converter, e.g. the engine coolant jacket, at which temperature sensing occurs involves a temperature level significantly lower than the level within the converter, equipment which is significantly less complex and expensive may be effectively utilized.

BRIEF DESCRIPTION OF THE DRAWING

The present invention will be better understood from the following detailed description of a preferred embodiment thereof taken in connection with the accompanying drawings wherein:

FIG. 1 is a schematic representation of an internal combustion engine including a dual bed catalytic converter system and showing the secondary air input control apparatus of the present invention;

FIG. 2 is a schematic sectional view depicting the remote location temperature sensing means of the invention in association with a secondary air control valve and showing the position of the components during warm-up;

FIG. 3 is a view similar to FIG. 2 showing the position of the components after the catalytic converter has reached operating temperature.

DETAILED DESCRIPTION OF THE PREFERRED EMBODIMENT

Referring now in detail to the drawing, there is schematically shown an internal combustion engine 10 including an exhaust manifold 12 which is connected to a dual bed axial flow catalytic converter 14 comprising a first catalyst bed 16 and a second catalyst bed 18. An air pump 20 delivers secondary air through a conduit 22 to a secondary air control valve 24 which operates, in a manner to be more fully hereinafter described, to deliver secondary air either to the engine exhaust manifold 12 of to a point between the catalyst beds 16 and 18. A temperature sensitive control valve 16 operates in response to engine temperature to apply a control signal to the secondary air control valve 24 which will determine the point of secondary air input to the catalytic converter system.

The air pump 20 which delivers secondary air to the conduit 22 is conventional and may be provided by anyone having ordinary skill in the art. The significant elements of the control system of the present invention are depicted in greater detail in FIGS. 2 and 3 which show the secondary air control valve 24 comprising a main body portion 28 defining an internal chamber 30 which receives secondary air from the pump 20 through the conduit 22 and which is in flow communication with a pair of outlet conduit 32 and 34. A plug 36 mounted upon a rod 38 extending to within the internal chamber 30 is actuated between a first and a second position by operation of a mechanism including a diaphram 40 and a spring 42 both mounted in operative relationship with the opposite end of the rod 38 to actuate the plug 36. The spring 42 operates under compression within a vacuum chamber 44 enclosed by a pressure tight cover 46 mounted in sealed relationship, in a manner apparent to anyone skilled in the art, to main body portion 28 of the control valve 24. The spring 42 tends to apply a force driving the plug 36 upwardly as viewed in FIGS. 2 and 3 thereby to seat the upper face 48 of the plug 36 against a seating surface 50 contiguous the inlet opening of the outlet conduit 32 to block air flow therethrough. With the plug 36 urged by spring 42 to its uppermost position as shown in FIG. 2 seated against the surface 50, air entering the chamber 30 through the conduit 22 will be directed to the conduit 34 due to the fact that conduit 32 will be blocked by plug 36.

The vacuum chamber 44 is in communication with the temperature sensitive control valve 26 through a vacuum conduit 51 attached in communication with the vacuum chamber 44 through the pressure tight cover 46. The temperature sensitive control valve 26 is attached to the engine 10 in a manner to sense and be responsive to the temperature at a location within the engine. In the specific embodiment described herein, the valve 26 is attached to have its temperature sensitive components exposed to the engine coolant 52, but it should be understood that other temperature locations within the engine 10 may be selected. The valve 26 includes a thermally sensitive probe 54 which is mounted in an appropriate engine location, e.g. through the engine coolant jacket, to be in contact with the coolant 52 for response to temperature changes therein. A stem 56 attached to the probe 54 or integrally formed therewith extends through an internal conduit 58 defined within a housing 60. An internal chamber 62 defined within the housing 60 is dimensionally larger in size than the internal conduit 58 thereby forming a seating surface 64 therebetween. The stem 56 has a plug 66 attached at the upper end thereof with a spring 68 operating in compression between the plug 66 and the housing 60 to bias the plug 66 downwardly against the seating surface 64. A conduit 70 is attached in communication between the internal conduit 58 and the engine intake manifold (not shown). The internal chamber 62 is in communication through the conduit 51 with the vacuum chamber 44 of the secondary air control valve 24.

When the engine coolant temperature is at the relatively lower levels encountered during warm-up, the plug 66 will be in abutment with the seating surface 64 thereby blocking communication between the conduits 51 and 58. As the temperature of the engine coolant 52 rises, the stem 56 will undergo thermal expansion as a result of the heat generated in the engine coolant 52 and transmitted through the probe 54, and this expansion will operate to raise the plug 66 from the seating surface 64 against the bias of the spring 68. When this occurs, the vacuum chamber 44 will be placed in communication with the internal chamber 62 through the conduit 51. The conduit 70 will permit the vacuum pressure of the engine intake manifold to be applied through the conduit 58 and the chamber 62 to the vacuum chamber 44. The engine intake manifold vacuum thus applied within the chamber 44 will cause the diagram 40 to be flexed against the force of the spring 42 thereby drawing the rod 38 downwardly whereupon the plug 36 will be moved from against the seating surface 50 and placed with its lower face 72 in abutment with a seating surface 74 contiguous the inlet opening of outlet conduit 34. When this occurs, communication between the outlet conduit 34 and the internal chamber 30 will be blocked and terminated, and communication will be established between the internal chamber 30 and the outlet conduit 32. So long as the temperature of the engine coolant 52 remains at a sufficiently high level to maintain the plug 66 out of contact with the seating surface 64, the intake manifold vacuum will be applied through the conduit 70 to the vacuum chamber 44 thereby retaining the diaphram 40 in its flexed position. This will retain the plug 36 with its lower face 72 in abutment with the seating surface 74 thereby effecting flow of secondary air from the conduit 22 through the chamber 30 and into the outlet conduit 32.

It should be understood that the valve 26 should be designed and constructed to permit application of the intake manifold vacuum to the secondary air control valve 24 only when the engine coolant temperature has reached an appropriate predetermined level. Prior to this, valve 26 should remain closed with plug 66 seated upon surface 64. By proper selection of the material and structure utilized for the stem 56 and the probe 54, thermal expansion may be provided which will operate to maintain plug 66 seated upon surface 74 whenever the temperature of the coolant 52 is below the predetermined level.

Of course, it will be apparent that many other devices, which may comprise bimetallic elements or bellows members, may be substituted for the specific structure of valve 26 which will operate to open a conduit between the secondary air control valve 24 and an actuating medium such as the intake manifold vacuum. It should be understood that such devices can be provided within the knowledge of those skilled in the art without departure from the scope and purview of the invention.

Thus, it will be seen that when the temperature of the engine coolant 52 falls below a predetermined level, thermal contraction of the plug 54 and of the stem 56 will enable the spring 68 to compress the plug 66 against the seating surface 64 thereby terminating the application of the intake manifold vacuum to the chamber 44. Since this will occur after the engine has been turned off, the diaphram 40 will no longer have applied thereto the vacuum pressure from the intake manifold whereupon the spring 42 will force the diaphram 40 to be deflected to its original position thereby driving the plug 36 back into abutment with the seating surface 50 to seal the outlet conduit 32. When this occurs, secondary air delivered from the air pump 20 upon starting of engine operation will flow through the conduit 22 and the chamber 30 into the outlet conduit 34.

In the operation of the device of the present invention, the outlet conduit 34 is connected to the engine exhaust manifold as far upstream as is practicable in order to insure that secondary air flowing through the conduit 34 will encounter the exhaust gases at their point of highest temperature. The outlet conduit 32 is connected to the catalytic converter at a point between the first bed 16 and the second bed 18 in order to introduce secondary air flowing through the conduit 32 at a point just ahead of the second catalyst bed 18.

In the initial stages of engine operation during warm-up, the temperature of the engine coolant 52 will be at lower levels and, consequently, the plug 66 will block application of the intake manifold vacuum pressure to the vacuum chamber 44. The plug 36 will be seated upon the seating surface 50 and secondary air flowing through conduit 22 from the air pump 20 will pass into the outlet conduit 34 to the engine exhaust manifold 12. Due to the relatively higher temperature levels of the exhaust gases encountered by the secondary air flowing through the conduit 34, oxidation of the impurities in the exhaust gases will occur within the engine exhaust manifold 12. This will produce a dual advantage in that not only will there by alleviation of the amount of impurity oxidation which must occur within the catalytic converter 12, but it will also produce higher gas temperatures at the inlet to the first catalyst bed 16 resulting from the heat of reaction of the oxidation occurring within the exhaust manifold 12.

The exhaust gases entering the first catalyst bed 16 will contain sufficient secondary air to create an oxidizing atmosphere in the bed 16, and as the gases pass therethrough further oxidation of the impurities will occur with the heat of reaction of such oxidation operating to accelerate achievement of a higher temperature within the bed 16. The second catalyst bed 18 will also provide an oxidizing atmosphere due to the fact that there will be sufficient secondary air remaining in the gases passing from the first bed 16 to enable further oxidation of the impurities.

As was previously stated, during warm-up the engine exhaust gases will be more heavily comprised of hydrocarbons and carbon monoxide, and it will be apparent that as a result of the operation previously described the entire catalytic converter 14 will be available for oxidation of these impurities during a period where the need for this type of reaction is greater. Furthermore, the oxidation which occurs will serve to accelerate the achievement of elevated temperatures most importantly in the first catalyst bed 16, but also in the second catalyst bed 18.

The dual bed catalytic converter 14 is considered to have reached optimum temperature levels when the temperature of the gases leaving the first catalyst bed 16 is approximately 1,000° F.. Because of the levels of temperature, i.e. in the 1,000° F. category, which must be maintained within the catalytic converter 14, relatively complex, expensive temperature sensing equipment would be required to sense temperatures directly within the converter 14.

In accordance with a primary concept of the present invention, the difficulties which would be encountered as a result of a necessity for sensing temperature directly in the beds of a catalytic converter are obviated by enabling sensing of temperatures remote from the converter beds, with the sensed remote temperatures being correlated to the temperatures within the converter to enable control of secondary air input in response thereto. The remote temperatures which may be sensed in the practice of the present invention will be significantly lower than the temperatures prevalent within the catalytic converter, thereby enabling the appropriate control function to be effected with far less complex, less costly apparatus. As shown in the description of the preferred embodiment set forth herein, the invention is arranged to sense the temperature of the engine coolant 52. It will be apparent that this temperature will be significantly lower than the temperatures which will be encountered directly within the catalytic converter. However, it should be clear that temperatures at other locations within the engine 10 may be sensed and correlated to coexisting temperatures within the catalytic converter 14 in a manner whereby a particular predetermined remote temperature may be sensed and utilized as an indication of a particular predetermined temperature within the catalytic converter.

Since the temperature level at which optimum switching of secondary air input should occur is at a gas output temperature from the first catalyst bed 16 of approximately 1,000° F., it will be understood to be within the knowledge of anyone having ordinary skill in the art to derive, based upon available data, an engine coolant temperature which will be correlated to a temperature of 1,000° F. of the gases exiting from the first catalyst bed 16. It will be found, in general, that for a converter gas temperature of approximately 1,000° F., the correlating engine coolant temperature may be estimated as falling withing the range between 120°to 180° F.. Temperatures at other engine locations could be similarly correlated to converter gas temperatures thereby formulating a basis for secondary air input control. For example, the temperatures of the engine lubricating oil could be similarly sensed and utilized.

It will be seen, therefore, that by application of the present invention temperatures which are significantly lower than the pertinent temperature in the catalytic converter 14 may be applied for secondary air input control. It will be noted that the temperature sensed, i.e. the temperature of the engine coolant 52, is at a level which is almost one-tenth the temperatures encountered within the catalytic converter 14.

By appropriate adjustment and calibration of the equipment described, the temperature sensitive control valve 26 may be operated to effect disengagement of the plug 66 from the seating surface 64 when the engine coolant temperature reaches a specific predetermined level, e.g. within the range between 120° to 180° F., which correlates to a temperature of 1,000° F. in the gases exiting the first catalyst bed 16. At this point, the intake manifold vacuum will be applied through the valve 26 to the valve 24 thereby actuating the plug 36 to open the conduit 32 and to close the conduit 34. When this occurs, secondary air entering the conduit 22 from the pump 20 will be diverted through the conduit 32 to a point between the catalyst beds 16 and 18 which will be at the input of gas flow to the catalyst bed 18. No secondary air will be applied at the input of the first catalyst bed 16 and, as a result thereof, the first catalyst bed 16 will no longer comprise an oxidizing atmosphere but will be converted to provision of a reducing atmosphere at an appropriate elevated temperature.

Subsequent to the switching of the secondary air input to between the catalyst bed 16 and 18, the dual bed catalytic converter 14 will commence operation at optimum temperatures to react oxides of nitrogen in the first catalyst bed 16, with the hydrocarbons and carbon monoxide contained in the exhaust emissions being oxidized in the second catalyst bed 18. The material chosen as the catalyst for the converter 14 is of the type which will promote either a reducing or an oxidizing reaction depending upon the availability of excess oxygen for oxidation, and it will be apparent that conversion from an oxidizing to a reducing atmosphere in the first catalyst bed 16 is readily accomplished by the switching of the secondary air input as previously described.

Thus, it will be seen that by the present invention there is provided a system for controlling and switching secondary air input which does not require special high temperature sensing equipment expensive and complex in its structure and operation. The invention enables utilization of readily available simplified equipment to provide a similar function in a practical and effective manner. The functions and operations of the equipment described may be readily performed by existing apparatus and in some cases it is possible that equipment presently utilized in commercially available vehicles could be inexpensively adapted to serve the described functions for control and reduction of pollutant emission from automotive vehicles.

Although the present invention has been described by reference to a specific structural embodiment thereof, it is to be understood that variations and modifications of the particular structure set forth may be effected by those skilled in the art, and that such variations and modifications are to be considered within the scope and purview of the present invention.

What is claimed is:

1. In a system for catalytic purification of exhaust gases from an internal combustion engine, said system including a catalytic converter comprising a first and a second catalyst bed, means defining a flow path for serially passing said exhaust gases through said beds, and means for providing air to said catalyst beds, the improvement comprising:
    valve means for directing flow of said air to within said flow path either to a first point ahead of said first catalyst bed or to a second point between said first and said second catalyst beds;
    means for sensing temperature at a point remote from said converter and comprising temperatures significantly lower than temperatures produced within said converter during engine operation; and
    means responsive to said temperature sensing means for actuating said valve means to direct said air to either said first or said second point.

2. A system according to claim 1 wherein said temperature sensing means comprise means for sensing temperature within said engine.

3. A system according to claim 2 wherein said temperature sensing means comprise means for sensing engine coolant temperature.

4. A system according to claim 1 wherein said temperature sensing means is adjusted to effect actuation of said valve means to direct said air from said first point to said second point at a specific predetermined temperature at said remote point which is correlated with a specific predetermined temperature within said catalytic converter.

5. A system according to claim 4 wherein said specific predetermined temperature within said catalytic converter is selected at 1,000° F.

6. A system according to claim 1 wherein said valve actuating means include means operatively associated with said engine to derive therefrom energy for actuating said valve means.

7. A system according to claim 6 wherein said engine includes an intake manifold, and wherein said means operatively associated with said engine comprise means for selectively applying vacuum pressure from within said intake manifold to actuate said valve means.

8. A system according to claim 1 wherein said internal combustion engine comprises an exhaust port from which exhaust gases are emitted and introduced into said catalytic converter flow path, said system comprising means for locating said first point at which said valve means directs air input to said flow path ahead of said first catalyst bed at said exhaust port.

9. A system according to claim 7 wherein said vacuum pressure applying means comprise means sensitive to engine temperature for controlling application of said vacuum pressure to said valve means in response thereto.

10. A system according to claim 7 wherein said vacuum pressure applying means comprise means defining a pressure path between said engine intake manifold and said valve means, and wherein said means sensitive to engine temperature comprise means for blocking said pressure path when said engine temperature is above a predetermined level.

11. A system according to claim 1 wherein said valve means comprise:
    a secondary air input conduit;
    a first secondary air output conduit connected to deliver air from said input conduit to said flow path ahead of said first catalyst bed;
    a second secondary air output conduit connected to deliver air from said input conduit to said flow path between said first and second catalyst beds; and
    plug means connected to be actuated between a first position blocking flow to said first output conduit and a second position blocking flow to said second output conduit 12. A system according to claim 11 comprising means for applying engine intake manifold vacuum pressure to actuate said plug means between said first and said second position in response to engine coolant temperature.

13. A method for applying secondary air in an exhaust gas catalytic purification system for an internal combustion engine, said system including a source of secondary air, a catalytic converter comprising a first and a second catalyst bed, and means defining a flow path for serially passing said exhaust gases through said beds, said method comprising the steps of:
    sensing temperature at a point remote from said catalytic converter, said remote point comprising temperatures significantly lower than temperatures produced within said converter during engine operation;
    correlating said sensed temperature with a temperature within said catalytic converter;
    applying said secondary air to a point in said flow path ahead of said first catalyst bed when said remote temperature is below a predetermined level; and switching application of said secondary air to between said first and said second catalyst beds when said remote temperature exceeds said predetermined level.

14. A method according to claim 13 wherein said switching occurs when said remote temperature is at a level correlated to a temperature of about 1,000° F at a point in said flow path between said first and second catalyst beds.

15. A method according to claim 13 wherein said remote temperature sensed is the temperature of the coolant of said internal combustion engine.

* * * * *

PO-1050
(5/69)

UNITED STATES PATENT OFFICE
CERTIFICATE OF CORRECTION

Patent No. 3,662,540          Dated May 16, 1972

Inventor(s) Richard C. Murphey

It is certified that error appears in the above-identified patent and that said Letters Patent are hereby corrected as shown below:

Column 3, line 73          12 "of" should read 12 --or--

Column 3, line 74          valve "16" should read valve --26--

Column 4, line 73          "diagram" should read --diaphram--

Column 5, line 57          "converter at" should read --converter 14 at--

Signed and sealed this 27th day of March 1973.

(SEAL)
Attest:

EDWARD M. FLETCHER, JR.          ROBERT GOTTSCHALK
Attesting Officer          Commissioner of Patents